United States Patent [19]

Pearce et al.

[11] Patent Number: 4,753,564
[45] Date of Patent: Jun. 28, 1988

[54] APPARATUS AND METHOD FOR EFFECTING MOVEMENT OF SELECTED TIERS OF STACKED ARTICLES USING PRESSURE DIFFERENTIALS

[75] Inventors: Ronald A. Pearce, Lakewood; Milton W. Kapke, Golden; William M. Jacoby, Loveland, all of Colo.

[73] Assignee: Goldco Industries, Inc., Loveland, Colo.

[21] Appl. No.: 6,113

[22] Filed: Jan. 23, 1987

[51] Int. Cl.$^4$ ................ B65G 59/04; B65G 60/00
[52] U.S. Cl. ................ 414/114; 294/64.1; 414/28; 414/42; 414/95; 414/121; 414/186
[58] Field of Search ............ 414/28, 29, 42, 95, 414/101, 114, 115, 121, 416, 417, 786; 294/64.1, 65

[56] References Cited

U.S. PATENT DOCUMENTS

| | | | |
|---|---|---|---|
| 2,150,960 | 3/1939 | Bertel | 414/29 |
| 3,123,232 | 3/1964 | Postlewaite | 414/29 |
| 3,289,860 | 12/1966 | Dean | 414/114 |
| 3,300,065 | 1/1967 | Witmer | 414/35 |
| 3,313,433 | 4/1967 | Hallenius | 414/416 |
| 3,404,787 | 10/1968 | Hayford | 414/114 |
| 3,522,890 | 8/1970 | Birchall | 414/32 |
| 3,544,410 | 12/1970 | Best et al. | 414/41 |
| 3,643,822 | 2/1972 | Birchall | 414/42 |
| 3,682,290 | 8/1972 | Von Gal, Jr. et al. | 414/42 |
| 3,757,966 | 9/1973 | Cox et al. | 414/64 |
| 3,780,884 | 12/1973 | Jones | 414/118 |
| 3,836,017 | 9/1974 | Bargstedt | 414/72 |
| 3,859,772 | 1/1975 | Thierion | 53/26 |
| 3,884,366 | 5/1975 | Leenaards | 414/37 |
| 4,242,025 | 12/1980 | Thibault | 414/70 |
| 4,252,497 | 2/1981 | Burt | 414/72 X |
| 4,338,055 | 7/1982 | Petersson | 414/114 |
| 4,566,836 | 1/1986 | Berger et al. | 414/57 |

FOREIGN PATENT DOCUMENTS

| | | | |
|---|---|---|---|
| 56-165627 | 12/1981 | Japan | 414/101 |
| 2113178 | 8/1983 | United Kingdom | 294/64.1 |

Primary Examiner—Leslie J. Paperner
Attorney, Agent, or Firm—Robert E. Harris

[57] ABSTRACT

Apparatus and method are disclosed for relative movement between stacked articles and a reference surface upon which the articles are stacked. Some, or all, independently movable layers, or tiers, of the stack of articles are received by a suspending device that includes a partial enclosure connected with a high pressure air pump capable of reducing the fluid pressure to establish a pressure differential within the partial enclosure. The partial enclosure has flexible sealing strips extending from, and coextensive with, the bottom edge of movable sections of the partial enclosure, and the sealing strips are positioned adjacent to the lowest tier to be acted upon by the suspending device. Upon creation of reduced pressure within the partial enclosure, lift is thereby maintained at the bottom surface of the selected tier having the sealing strips positioned adjacent thereto (with the surface below the selected tier then being a reference surface) so that, when relative movement having a vertical component is effected between the selected tier of articles and the reference surface, the selected tier (and all tiers stacked on the selected tier) can either be lifted or caused to remain substantially in place to allow other operations for arranging a desired load, for example removal and/or insertion of slip sheets, pallets, and/or stacked articles of a different variety, to be carried out.

15 Claims, 8 Drawing Sheets

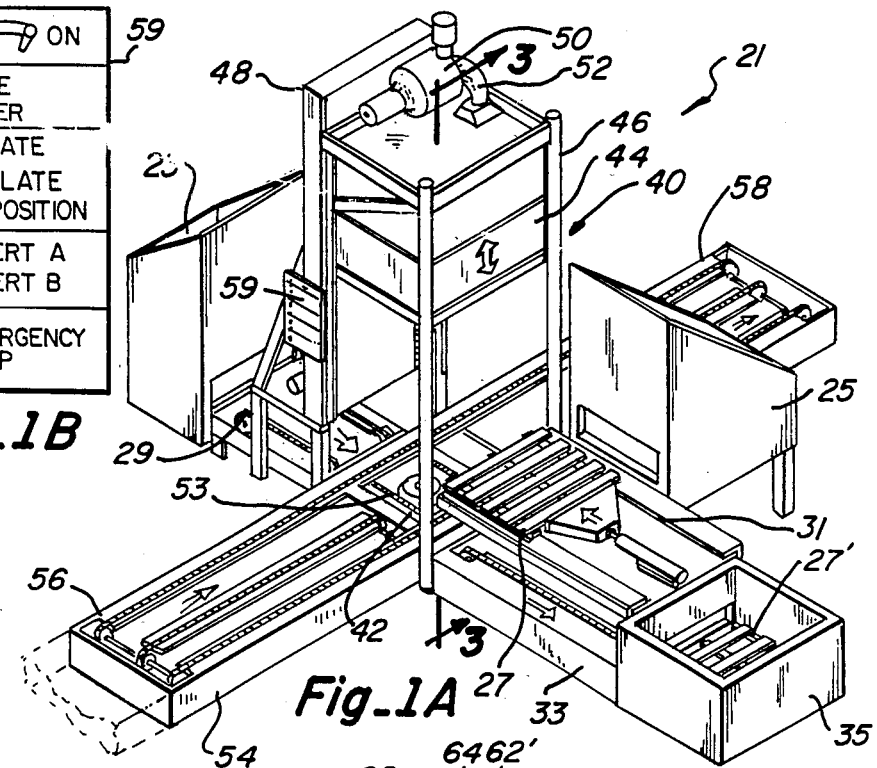
Fig._1B
Fig._1A
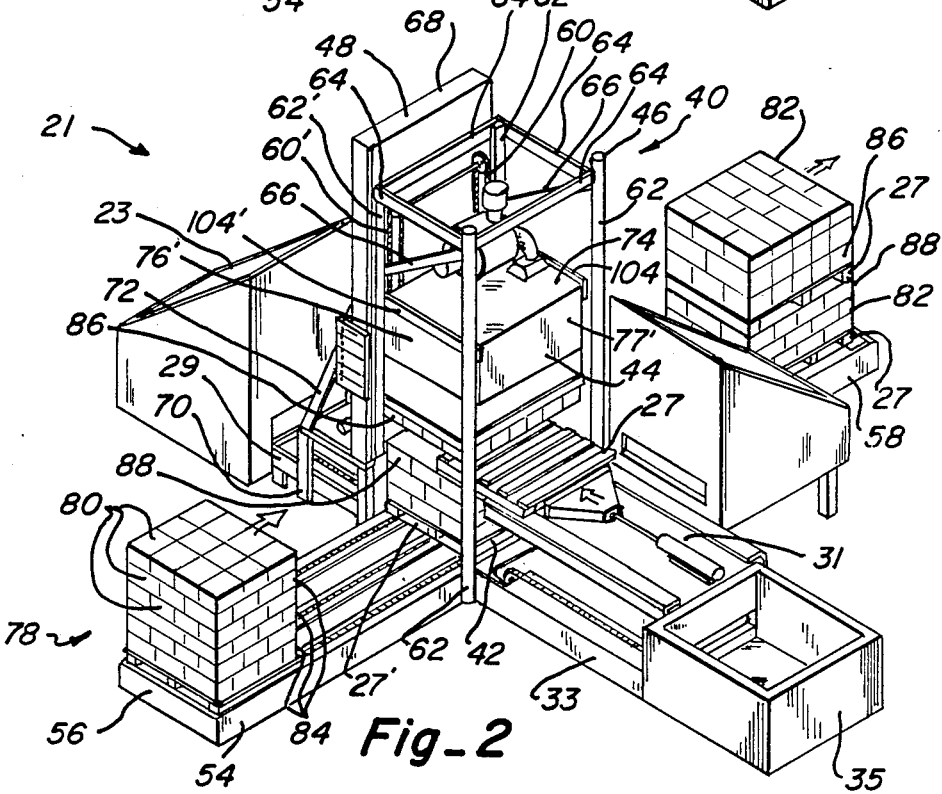
Fig._2

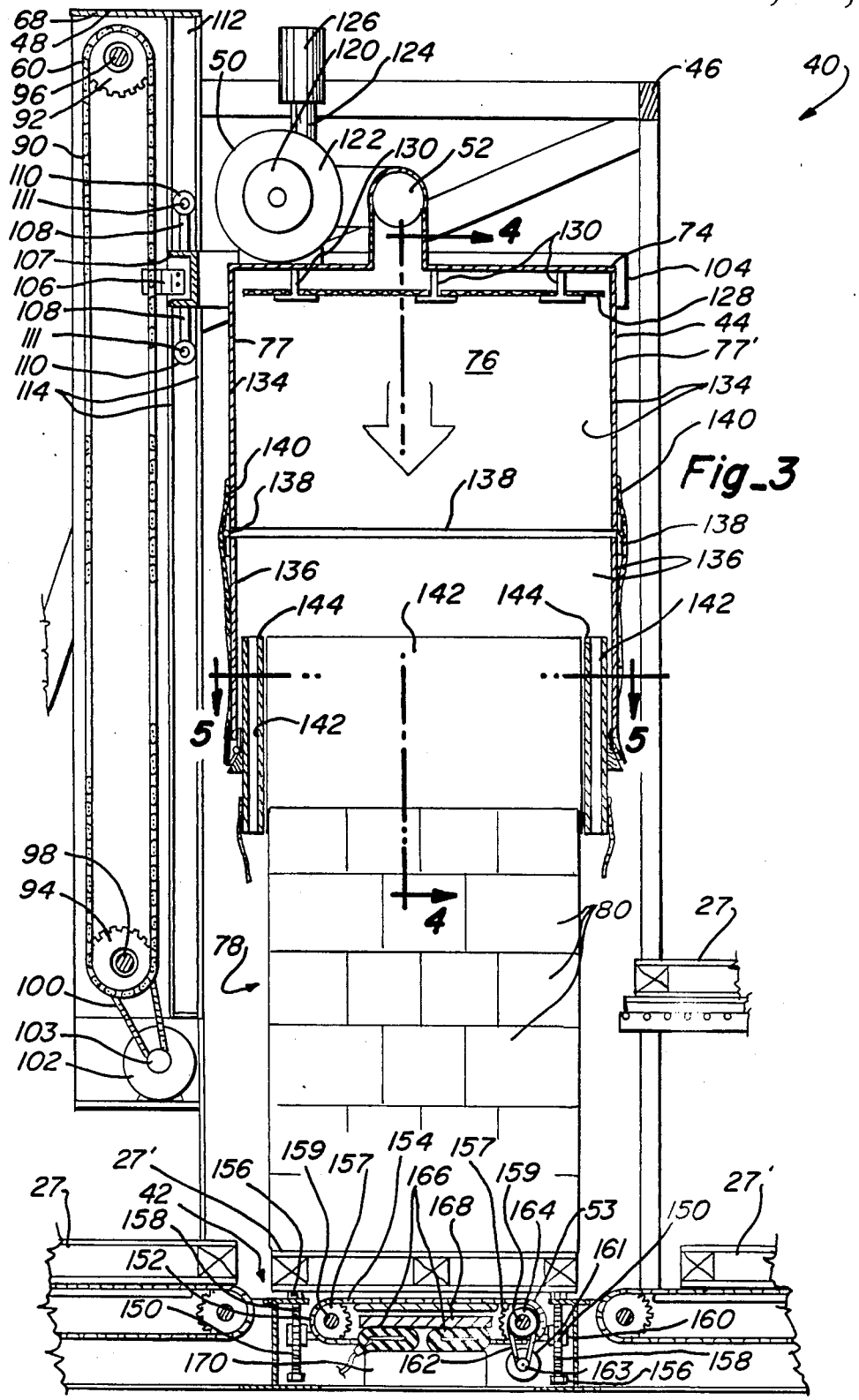

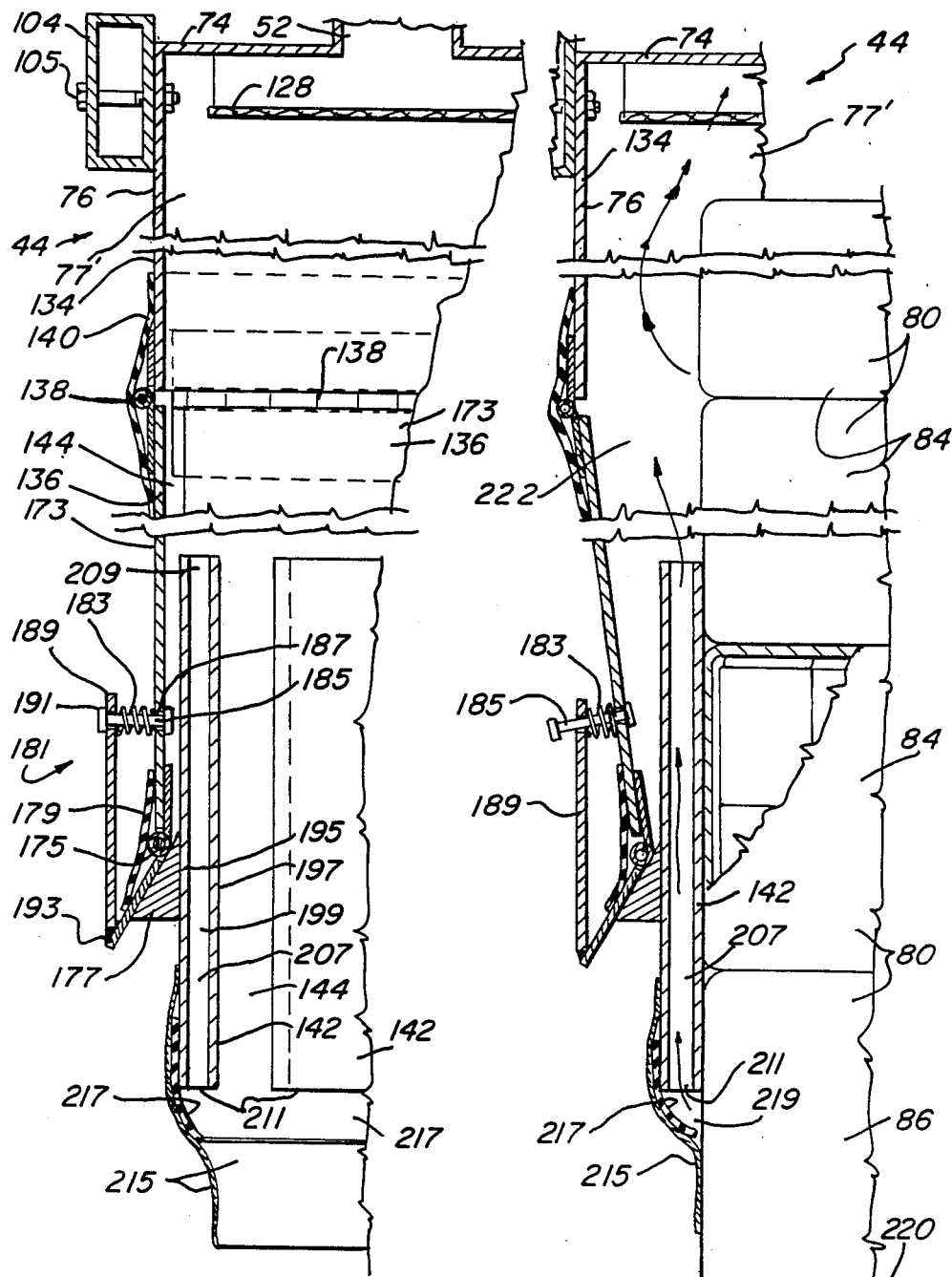
Fig_4A
Fig_4B

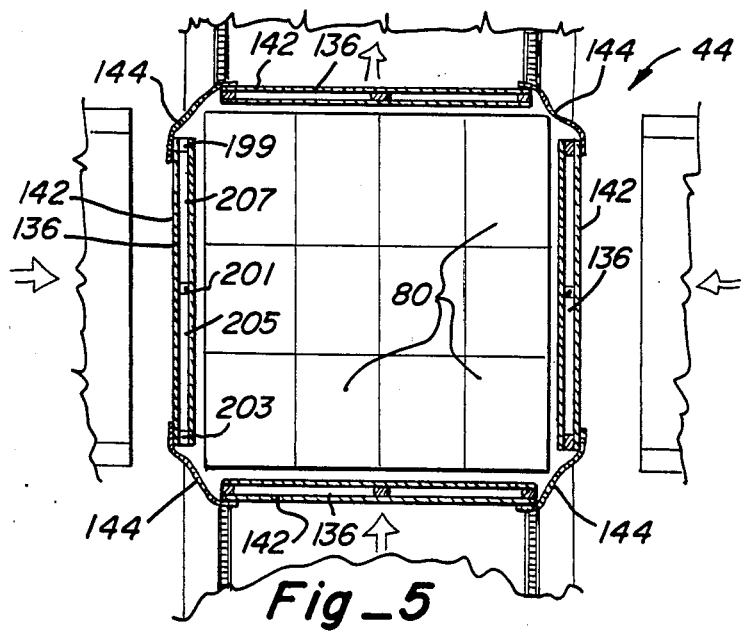
Fig_5
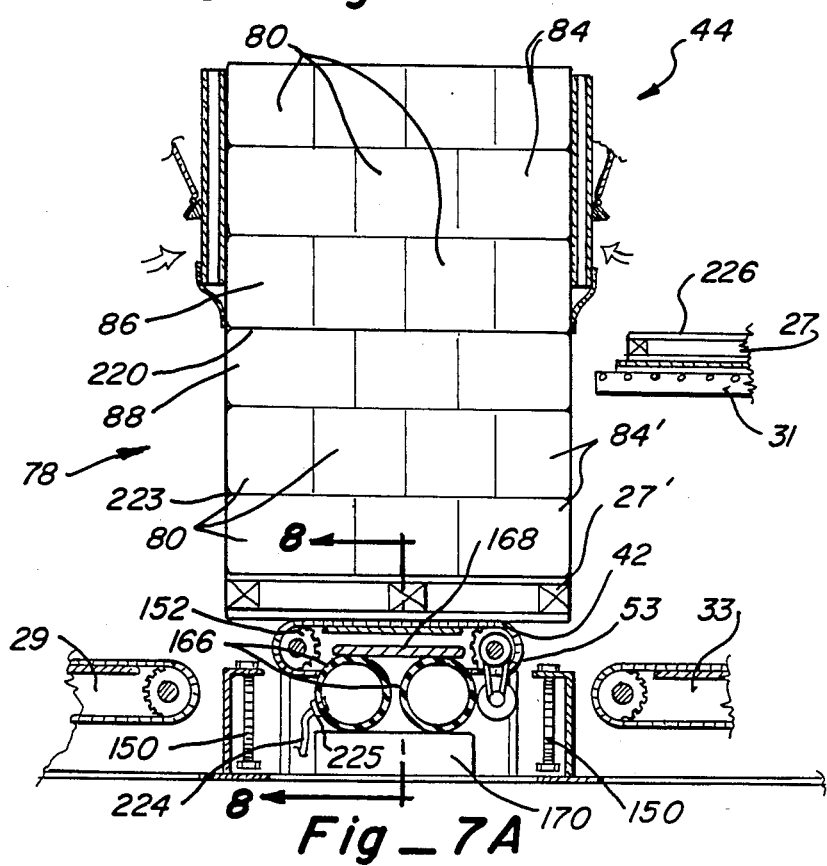
Fig_7A

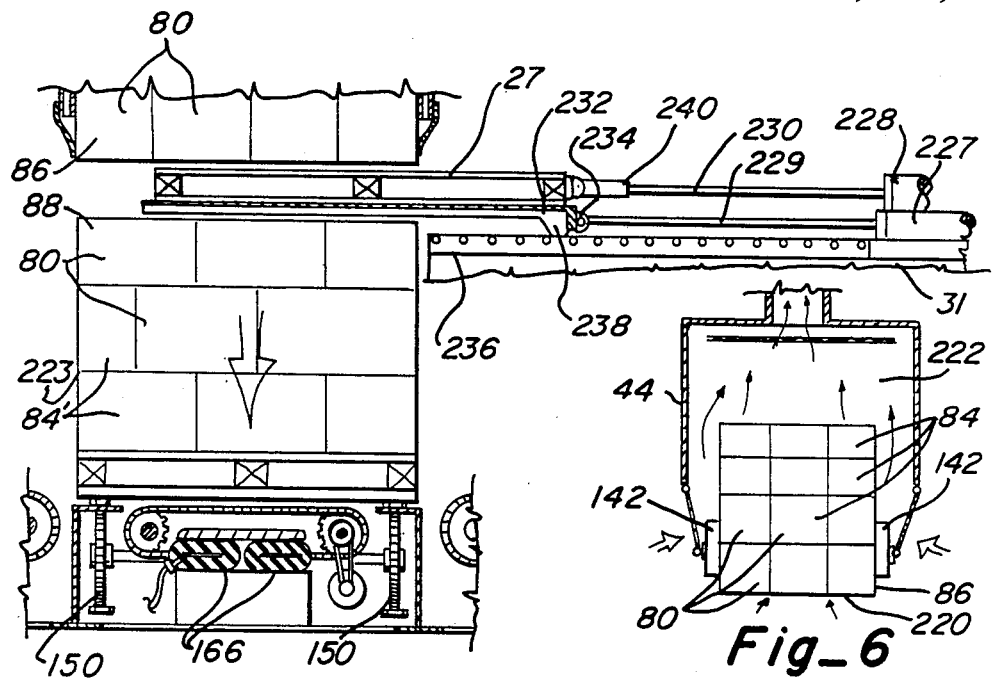
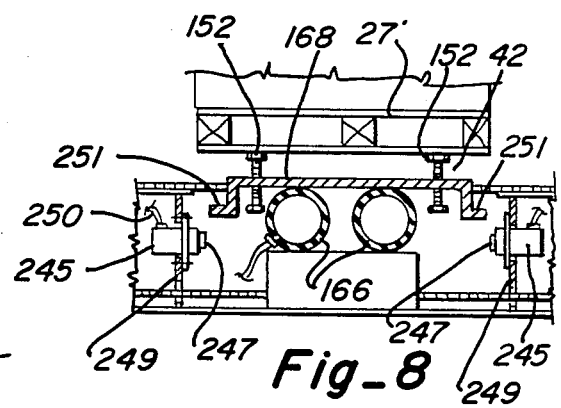
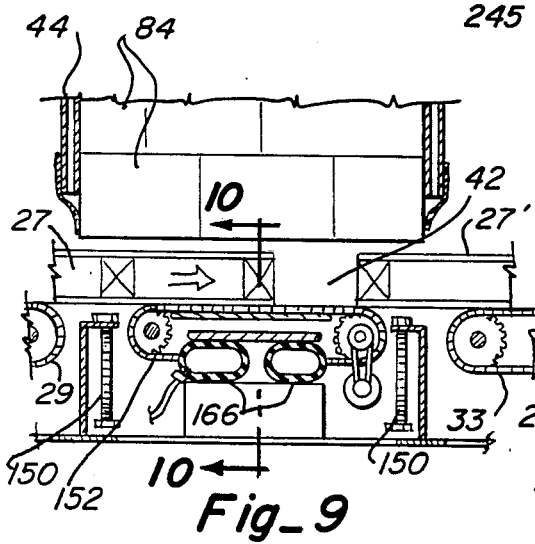
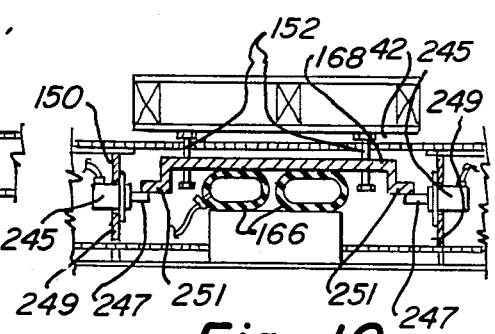

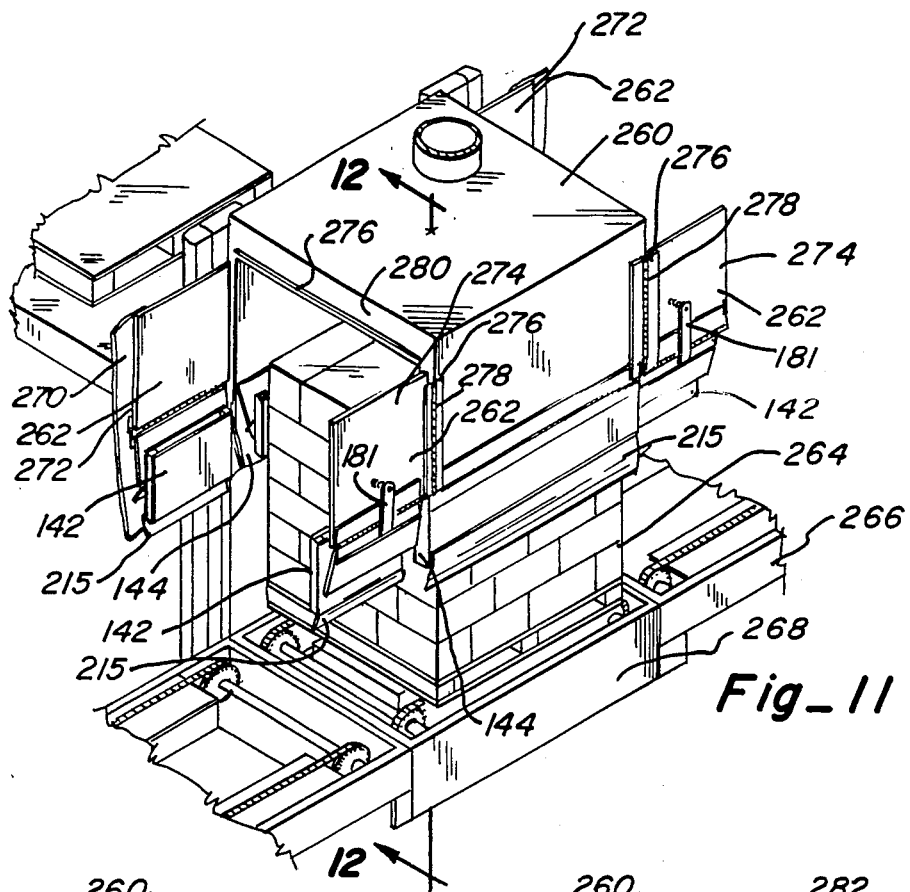
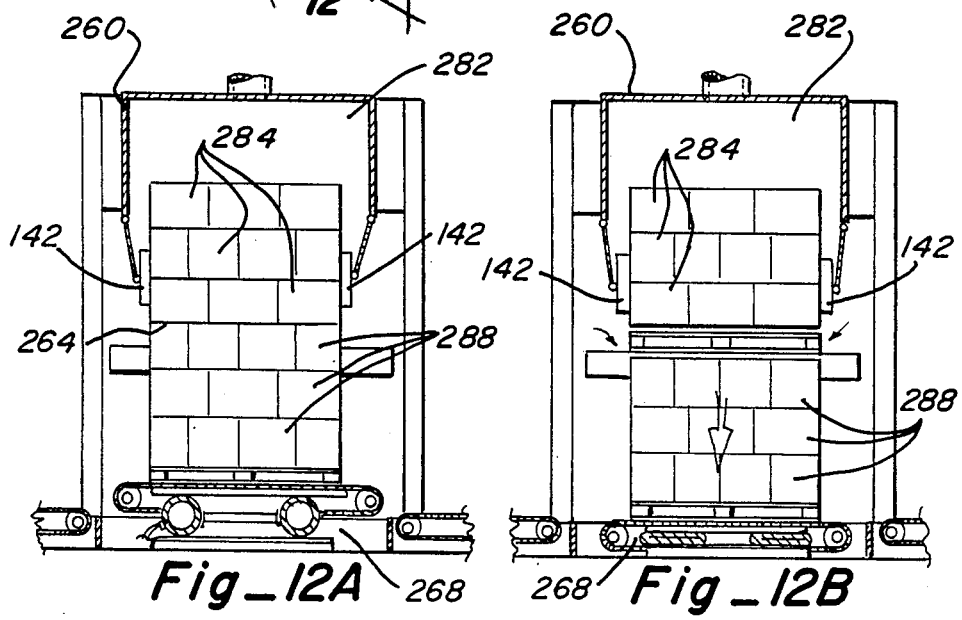

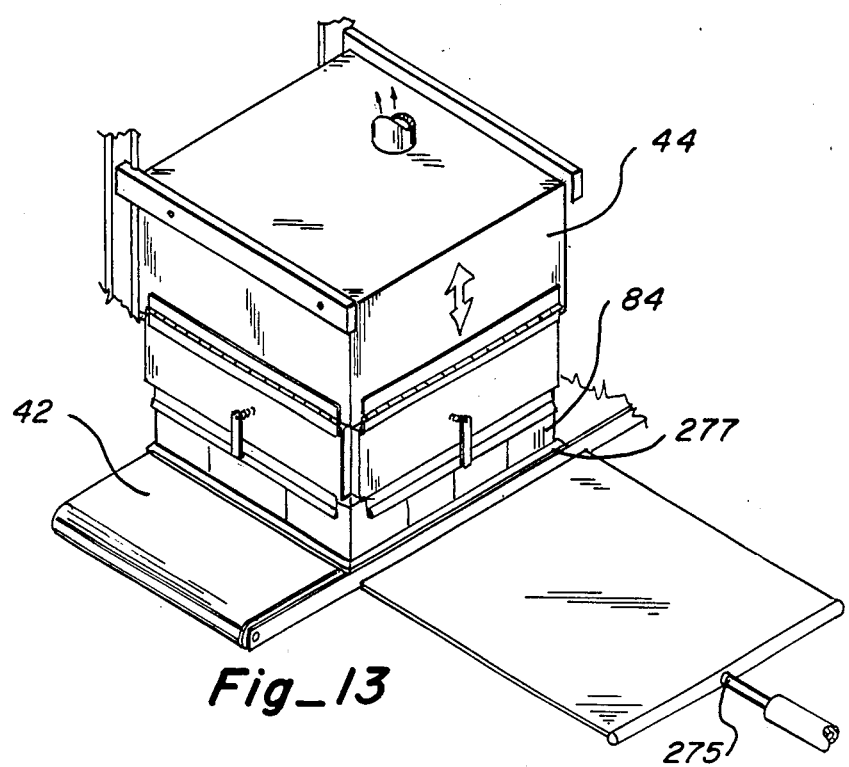
Fig_13
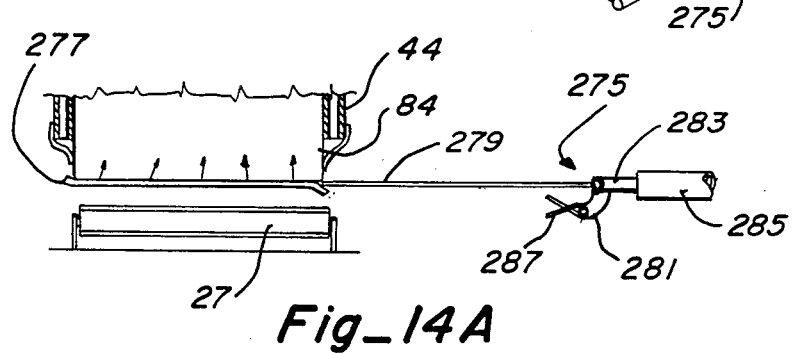
Fig_14A
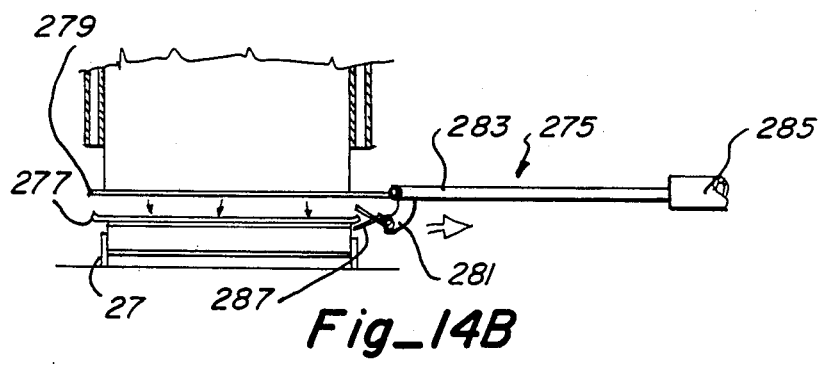
Fig_14B

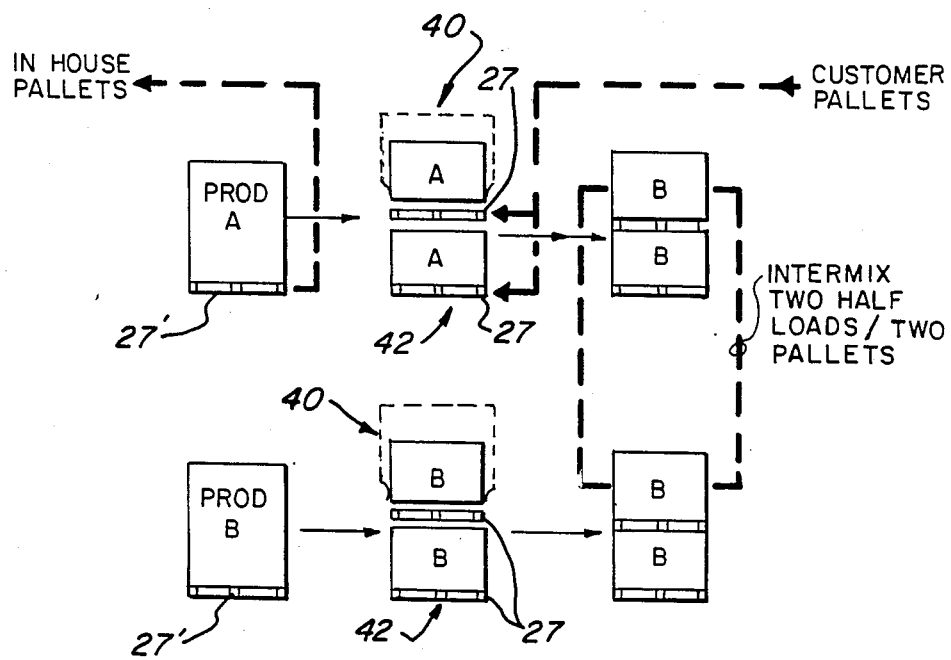
Fig_15A
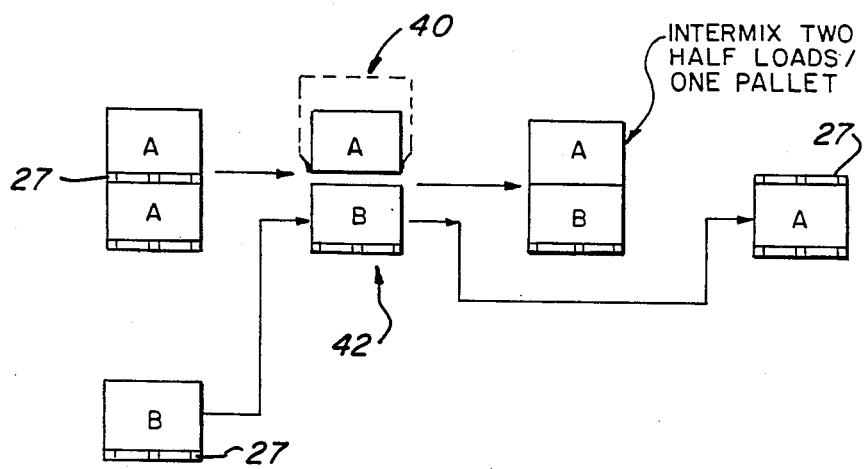
Fig_15B

4,753,564

APPARATUS AND METHOD FOR EFFECTING MOVEMENT OF SELECTED TIERS OF STACKED ARTICLES USING PRESSURE DIFFERENTIALS

FIELD OF THE INVENTION

This invention relates to apparatus and method for movement of articles stacked in tiers, and, more particularly, relates to apparatus and method for movement of selected tiers of stacked articles using pressure differentials.

BACKGROUND OF THE INVENTION

Lifting devices for elevating stacked articles employing a support member inserted beneath the articles to be lifted, as, for example, using forklifts for elevating palletized loads, are well known and have been heretofore suggested and/or utilized. Additional examples of stacked article lifting devices can be found in U.S. Pat. Nos. 3,522,890, 3,643,822, and 3,884,366.

Devices for elevation of a single layer of articles employing vacuum cups, magnetic heads and the like are also well known and such devices have heretofore been suggested and/or utilized for the arrangement of articles into desired loads (see, for example, U.S. Pat. Nos: 4,242,025, 3,780,884, 3,757,966, 4,252,497, 4,566,836, 3,859,772, 3,836,017, 3,544,410, 3,682,290, and 3,300,065.

Various palletizing and depalletizing devices employing push cylinders, bulkheads, clamps and/or tilting mechanisms have also been heretofore suggested and/or utilized for removal of articles from, and/or placement of articles on, pallets and the like.

While such devices now known have been found to be acceptable for some uses, such devices have not been found to be capable of and/or suitable for suspending multiple layers, or tiers, of stacked articles relative to a reference surface without the necessity of providing a supporting member at the bottom surface of the suspended load or high clamping forces to the load. Moreover, no such known devices have been capable of establishing a pressure differential to effect suspending, or lifting, of selected plural tiers of articles.

SUMMARY OF THE INVENTION

This invention provides apparatus and method for relative movement of multiple, independently movable layers, or tiers, of articles arranged in a stack and a reference surface upon which the tiers are resting whereby the tiers of articles are suspended without necessity of a supporting member at the bottom surface of the tiers of articles by establishment of a pressure differential to effect suspending, or lifting, of selected plural tiers of articles.

It is an object of this invention to provide an apparatus and method for effecting relative movement between selected independently movable layers of stacked articles and a reference surface.

It is another object of this invention to provide an device for suspending selected multiple layers of stacked articles above a reference surface.

It is yet another object of this invention to provide a device for holding selected multiple tiers of stacked articles by establishment of a differential pressure adjacent to the selected multiple tiers of articles while imparting relative motion having a vertical component between the tiers so held due to said established pressure differential and the surface upon which the tiers initially rested, which surface can be an adjacent lower tier of articles.

It is still another object of this invention to provide a device for separating tiers of stacked articles from a reference surface using a partial enclosure for receipt of the tiers of articles, the partial enclosure and the bottom tier of the tiers of articles forming a substantially enclosed area, and means for reducing fluid pressure within the substantially enclosed area.

It is still another object of this invention to provide an apparatus and method for separating tiers of articles from an initial reference surface for establishing a new reference beneath tiers of articles.

It is yet another object of this invention to provide an apparatus and method for creating a desired arrangement of articles stacked in tiers and units enabling definition of desired groupings of such articles, for example pallets and slip sheets.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1A is a perspective view of the apparatus of this invention shown in connection with a pallet ready for insertion at a desired position;

FIG. 1B is a front view of the control panel shown in FIG. 1A;

FIG. 2 is a perspective view of the apparatus of this invention, as shown in FIG. 1A, illustrating operation of the apparatus for insertion of a pallet between tiers of articles to create two stacked half loads of articles on two pallets;

FIG. 3 is a front sectional view taken through lines 3—3 of FIG. 1A;

FIGS. 4A and 4B are partial side sectional views taken through lines 4—4 of FIG. 3 illustrating different operational positioning of the device for suspending tiers of articles;

FIG. 5 is a sectional view taken through lines 5—5 of FIG. 3;

FIG. 6 is a schematic illustration of fluid flow and resulting pressure differential and lift experienced in operation of the device of FIGS. 3, 4A and 4B;

FIGS. 7A and 7B are partial front views of the apparatus, as shown in FIG. 2, illustrating a second arrangement for separating tiers of stacked articles for insertion of a pallet therebetween employing pneumatic balloons for raising and lowering the reference surface;

FIG. 8 is a side sectional view taken through lines 8—8 of FIG. 7A;

FIG. 9 is a partial front view of the apparatus shown in FIGS. 7A, 7B, and 8 illustrating intermediate inflation of the pneumatic balloons for pallet insertion at the reference surface;

FIG. 10 is a side sectional view taken through lines 10—10 of FIG. 9;

FIG. 11 is a perspective view of another embodiment of the apparatus of this invention;

FIGS. 12A and 12B are side sectional views taken through lines 12—12 of FIG. 11 illustrating different operational positioning of the embodiment of the apparatus of FIG. 11;

FIG. 13 is a perspective view of a third embodiment of the apparatus of this invention particularly illustrating a means for insertion and removal of slip sheets beneath a suspended load;

FIGS. 14A and 14B are partial side views of the embodiment of the apparatus shown in FIG. 13 illustrating removal of a slip sheet; and FIGS. 15A and 15B are flow diagrams illustrating methods for achieving desired loads using the apparatus of this invention.

DESCRIPTION OF THE INVENTION

Apparatus 21 is shown in FIG. 1A for achieving relative movement of selected tiers of stacked articles each tier being independently movable and having multiple rows of multiple articles, and a reference surface on which the selected tiers of articles are stacked, which reference surface can be, for example, a lower nonselected tier of articles or a pallet upon which the articles are stacked, with relative movement being effected, for example, to arrange the articles into desired loads. As shown, apparatus 21 includes pallet magazines 23 and 25 for ejection of pallets (for example pallet 27), onto conveying units 29 and 31. Pallet magazines 23 and 25 may eject, for example, customer pallets for insertion into a load (as shown in FIG. 2) or for replacement of in-house pallets. For example, in-house pallets 27' may be replaced at the bottom of a load, with the in-house pallet being conveyed away on conveyor 33 to pallet stacker 35.

As also shown in FIG. 1A, suspending device 40 is positioned above work surface 42, and includes an open bottomed, partial enclosure 44 maintained within elevator framework 46 adjacent elevator 48. Partial enclosure 44 has a high pressure air pump, or blower, 50 mounted on the top thereof for reducing the fluid pressure within enclosure 44 through duct 42 to create a lower pressure, or partial vacuum, within enclosure 44.

Conveying section 53 intersects conveyor sections 29 and 33 (at a right angle as shown in FIGS. 1A and 2) and forms a part of continuous conveyor 54 having a product delivery section 56 and a product removal section 58. Control panel 59, as best shown in FIG. 1B, is provided for selective control of operations as described hereinafter. While manual switching is illustrated herein, it is, of course, to be understood that automatic, or semi-automatic, operation could be effected by automatic event sequencing using a timed controller, or computer, in conjunction with positioning and/or motion sensors and associated timing devices.

As illustrated in FIG. 2, partial enclosure 44 is vertically movable within elevator framework 46 on elevating mechanisms 60 and 60' of elevator 48. Elevator framework 46 includes front vertical structural members 62 and rear vertical structural members 62' connected at the upper portions thereof by cross members 64. Brace members 66 further stabilize framework 46. Vertical structural members 62' are anchored, for example by welding or bolting, to elevator housing 68 which is attached to elevator housing stand 70 and further stabilized thereon by brace members 72 (only one of which is shown in FIG. 2).

Partial enclosure 44 includes top wall 74 and side walls 76, 76', 77 and 77', only two of which are shown in FIG. 2, it being understood that four such side walls are present, the side walls being joined to the top wall and substantially sealed thereat, for example, by welding.

FIG. 2 illustrates the overall operation of suspending device 40 for altering the configuration of palletized loads. A palletized load 78, consisting of tiers, or layers, of stacked articles 80, is presented at work surface 42 by delivery section 56 of conveyor 54. As shown in FIG. 2 for illustrative purposes, the operation undertaken thereat is the division of palletized load 78 into half loads 82 on separate pallets 27 (which may be, for example, customer pallets as opposed to in-house pallets 27', as also shown in FIG. 1A, which are normally retained in-house by the manufacturer).

Partial enclosure 44 may be lowered over a selected number of independently movable layers, or tiers, 84 of articles 80 (by activation of the switch marked "LOWER" in FIG. 1B), so that approximately half of the tiers are encompassed within partial enclosure 44. As more fully developed hereinbelow, work surface 42 may, in advance, be raised (by activation of the switch marked "INFLATE" in FIG. 1B). Pump, or blower, 50 is then energized (for example, using the "OFF"/"ON" switch on FIG. 1B) for creation of a partial vacuum within the enclosure resulting in, as will be more fully set forth hereinafter, a differential pressure surrounding the tiers 84 to be suspended, thereby maintaining the tiers within the partial enclosure.

Relative motion is thereinafter imparted between partial enclosure 44 and work surface 42 having a vertical component, for example by lowering of the work surface 42 (i.e., activation of the "DEFLATE" switch in FIG. 1B) and/or raising of the partial enclosure 44 by elevator 48 (by activation of the "RAISE" switch in FIG. 1B), and a space is created, between bottommost tier 86 of the load within the enclosure 44 and the topmost tier 88 of the tiers remaining at the work surface 42 (the top of the tier 88 thus providing a reference surface for the tiers selected to be within partial enclosure 44), for insertion of a customer pallet 27 therebetween by pallet conveyor 31 (for example, by activation of the "INSERT B" switch of FIG. 1B).

As may be appreciated, partial enclosure 44 could be lowered so as to enclose all tiers 84 of the stacked load 78 for suspension of the entire load 78 and removal of in-house pallet 27' by delivery of a customer pallet 27 on conveyor 29 from magazine 23 to work surface 42 (by activation of the "INSERT A" switch shown in FIG. 1B) thereby ejecting in-house pallet 27' from the work surface for removal on conveyor 33 to pallet stacker 35.

After desired operations have been accomplished, relative motion is reversed (for example, by activation of the "INFLATE" and/or "LOWER" switches shown in FIG. 1B), bringing bottommost tier 86 to rest on pallet 27, blower 50 is deactivated and partial enclosure 44 is raised and/or work surface 42 is lowered so that the half loads 82 may be conveyed away from work surface 42 on removal section 58 of conveyor 54.

Turning now to FIG. 3, a sectional view of suspending device 40 and work surface 42 is shown. Elevator 48 is shown to include elevating mechanism 60 (only one of which is shown and described in FIG. 3, it being understood that a second elevating mechanism 60' is provided as shown in FIG. 2) within elevator housing 68, mechanism 60 including elevating chain 90 on chain drive wheels 92 and 94 mounted on drive shafts 96 and 98. Shaft and wheel 94 and 98 are connected by drive belt 100 to reversible drive motor 102 at belt pulley 103 for reversible rotatational motion of drive chain 90.

Partial enclosure mounting fork 104 (the details of only one of which are shown and described here and in FIG. 3, it being understood a second such fork 104' as shown in FIG. 2 is provided and mounted in a substantially similar fashion) are connected to partial enclosure 44 at opposite side walls 76 and 76' (as shown in FIG. 4A using bolt and nut assemblies 105) near top wall 74.

Fork 104 is also connected to elevator chain 90 by linkage 106 which is mounted to fork 104 at one end, for example by bolting, and to chain 90 at the other end, for example with pins or by clamping, for thereby imparting substantially vertical motion to fork 104 and partial enclosure 44 upon activation of elevating mechanism 60.

Forks 104 and 104' (shown in FIG. 2) are connected by horizontal channel 107 by, for example, welding. Forks 104 and 104' are further maintained in a substantially horizontal disposition by provision of guide arms 108 rotatably connected to guide wheels 110, for example by axle 111, and also connected to fork 104, for example by bolting arms 108 to fork 104. Guide arms 108 and wheels 110 reside within vertical fork stabilizer housing 112, wheels 110 being maintained within vertical tracks 114 of housing 112 for thereby maintaining fork 104 in a substantially horizontal disposition while fork 104 and partial enclosure 44 are being moved in a substantially vertical direction by elevator 48.

Partial enclosure 44, as best shown in FIG. 3, includes top wall 74, side walls 76 and 77, and blower 50 connected to the interior of partial enclosure 44 by duct 52. Blower 50 includes blower motor 120 and squirrel cage 122, with blower motor 120, squirrel cage 122 and duct 52 being mounted to top wall 74 of partial enclosure 44 by, for example, bolting of the elements thereto. Blower outlet 124 may include muffler 126 for lessening blower motor noise. Blower 50 may be usefully configured, for example, to move 2000 cubic feet per minute of air and to develop 2 pounds per square inch of pressure (or, at the interior of partial enclosure 44 when substantially sealed, to develop a −2 pounds per square inch of fluid pressure therein).

Filter screen 128 is provided at the upper portions of enclosure 44 to keep foreign matter from passing through duct 52 and into blower 50, and is mounted to top wall 74 of enclosure 44 by, for example, mounting pins 130.

All four side walls 76, 76', 77 and 77' of partial enclosure 44 include upper section 134 and lower section 136, as shown with respect to side walls 76, 77 and 77' in FIG. 3, with the upper sections 134 of side wall 76, 76', 77 and 77' being affixed to one another and top wall 74, for example, by welding. Lower sections 136 are movably connected to upper sections 134 by hinges 138, hinges 138 being covered by sealing material 140 for maintaining a substantially sealed, hinged relationship between upper sections 134 and lower sections 136 of the side walls of enclosure 44.

All four lower sections 136 (only three of which are shown in FIG. 3, it being understood that all four side walls include similar elements) include channeled wall sections 142 which are discussed in detail hereinbelow. All four of the lower wall sections 136, as well as the relate four channel portions 142, are connected with each other by flexible sealing strips 144 (as shown most clearly in FIGS. 4A and 5). With the blower 50 disengaged, partial enclosure 44 may be lowered on forks 104 and 104' by elevator 48 over palletized load 78 of stacked articles 80, the area between opposing channeled sections 142 being sufficient to receive the load (as also shown in FIG. 5).

Work surface 42 includes right angle conveying section 53 having primary conveying mechanisms 150 (aligned with conveyor 54 in FIG. 1A), and right angle conveying mechanisms 152 (only one of which is shown in FIG. 3, it being understood that a second such mechanism is provided as shown in FIG. 8). Conveying mechanisms 152 and 150 include conveying chains 154 and 156 on drive wheels 157 and 158 mounted on drive shafts 159 and 160, respectively. Mechanisms 150 are conventionally driven in association with continuous conveyor 54 (as shown in FIG. 1). Mechanisms 152 are driven by motor 161 connected to drive shaft 159 by belt 162 over motor pulley 163 and shaft pulley 164.

Right angle conveying mechanisms 152 are vertically adjustable on elevating balloons 166 maintained between mechanism support plate 168 and base plate 170 for thereby elevating work surface 42 as will be set forth in more detail hereinafter. Conveying mechanism drive shafts 159 are mounted through support plate 168, for example, on bearings.

Turning now to FIGS. 4 and 5, detailed views of the lower section 136 of side wall 76, 76', 77 and 77' and channeled sections 142 are shown. As shown in FIG. 4A, with respect to side wall 76, lower sections 136 of side walls 76, 76', 77 and 77' include plate portion 173 connected to channeled sections 142 by hinge 175 mounted, for example by bolting, between plate portion 173 and mounting block 177 connected, for example by welding, to channeled section 142. Hinge 175 is covered by a sealing strip 179 for maintaining a substantially sealed relationship between plate portion 173 and channeled section 142. When no negative air pressure is established at the interior of partial enclosure 44 by blower 50 through duct 52, the components of side walls 76 are maintained in, and/or returned to, a substantially vertical configuration, channeled section 142 thus maintained by spring unit 181.

Spring unit 181 includes compression spring 183 mounted around pin 185, with pin 185 being maintained in plate portion 173 through mounting hole 187 at one end, and through retaining plate 189 at its other end, the pin being maintained at retaining plate 189 by nut 191. Retaining plate 189 is fastened at its lower end to hinge plate section 193 fastened to block 177.

Channeled section 142 includes channel outer walls 195 and 197, with channel walls 195 and 197 being held in a spaced relationship at their outer ends and at their center by spacer plates 199, 201 and 203, which may, for example, be welded in place, thereby defining channels 205 and 207 (as most clearly shown in FIG. 5). Channels 205 and 207 are open at their upper and lower ends to passage of air therethrough at openings 209 and 211, respectively.

As also shown in FIG. 4A with respect to side walls 76 and 77', sealing strips 215 are attached to channeled sections 142 using, for example, glue or rivets, at channel wall 195 at the lower end of channeled section 142, and are maintained over retainers 217 also attached to wall 195, for example by welding, near channel openings 211, the seals 215 extending beyond retainers 217, and defining a substantially continuous sealing flap around the bottom of partial enclosure 44.

Turning to FIG. 4B, when blower 50 is energized, the fluid pressure within partial enclosure 44 is lowered thereby drawing channeled sections 142 into contact with articles 80 at the lower of tiers 84 of the stack and drawing sealing member 215 into contact with the lowest tier 86 to be suspended in partial enclosure 44 while yet maintaining a space 219 below channel opening 211 between retainer 217 and tier 86. Compression spring 183 is compressed on pin 185 by the relative movement of retaining plate 189 on pin 185.

When seal 215 is in place, side walls 76, 76', 77 and 77', top wall 74 and bottom surface 220 of lower tier 86 form a substantially enclosed area 222 extending around the tiers of articles 80 and through channels 205 and 207 of channeled section 142 and to space 219 between retainer 217 and tier 86. Substantially enclosed area 222 thus defines a zone of differential pressure within partial enclosure 44.

When tiers 84 and 86 are thus enveloped, partial enclosure 44 may be raised, or work surface 42 may be lowered, for insertion, for example, of a customer pallet 27 below tier 86, the tiers of articles being maintained within impartial enclosure 44 by the differential pressure created within th substantially enclosed area 222, and without necessarily requiring high friction surfaces at channeled section 142 or articles 80.

Upon deactivation of blower 50, the pressure differential within substantially enclosed area 222 is allowed to equalize and compression spring 183 will return channeled sections 142 of the side walls back into substantially vertical alignment with upper sections 134, thereby releasing tiers 84 and 86 for removal from the work surface.

FIG. 6 diagrammatically illustrates the forces created by application of the zone of differential pressure within substantially enclosed area 222 and adjacent to the tiers 84 and tier 86. For example, if blower 50 shown in FIG. 3 is a 30 horse power blower, about—1.5 p.s.i. of pressure is developed within enclosed area 222. If bottom surface 220 of lower tier 86 has, for example, an area of 1900 inches$^2$, about 2700 pounds of lift is developed at the bottom surface 220 of lower tier 86 (1.5 p.s.i. $\times$ 1900 inches$^2$=2700 pounds) upon contact and sealing of channeled sections 142 against tiers 84 and 86 under the influence of fluid movement induced by blower 50 through partial enclosure 44. The upward lift thus developed has been found sufficient to maintain a load within partial enclosure 44 during periods of suspension when no supporting member is provided at bottom surface 220 of lower tier 86 of articles 80 while minimizing stresses which might otherwise damage the articles.

FIGS. 7A and 7B illustrate that in addition, or as an alternative, to the raising and lowering of tiers 84 and 86 in partial enclosure 44, work surface 42 may be raised and lowered by means of pneumatic balloons 166 by the amount necessary to create a space between tiers 86 and 88 for insertion of customer pallets 27 therebetween from conveyor 31, or for conducting other operations, for example removal of lower half 223 of palletized articles 78 and replacement thereof with a different half load or suspension of all tiers 84, 84', 86 and 88 for insertion of a customer pallet and removal of in-house pallet 27' employing conveying units 29 and 33.

Upon receipt of palletized stacked articles 78 at work surface 42, partial enclosure 44 is lowered and balloons 66 fully inflated through supply line 224 and valve 225 (supplied, for example, by an in-house air supply) upon activating of the "INFLATE" switch of control panel 59 in FIG. 1B, thereby raising conveyor mechanisms 152 above conveyor mechanisms 150 and conveyors 29 and 33 to a position where lowermost tier 86 of the tiers to be suspended within partial enclosure 44 has the bottom surface 220 thereof positioned for receipt of top surface 226 of customer pallet 27 thereat, as shown in FIG. 7A.

As shown in FIG. 7B, balloons 166 are thereafter deflated thereby lowering tiers 84' and 88 of articles 80 and creating a gap between tiers 86 and 88. Conveyor 31 includes cylinders 227 and 228 having shafts 229 and 230 respectively extendible therefrom with shaft 229 being connected to pallet plate 232 at pin mount assembly 234. Pallet mount 232 is slidable along conveyor base 236 on slide block 238. Pallet 27 rests on pallet mount 232, with cylinder shaft 230 having ram 240 upbutting pallet 27. Shafts 229 and 230 may then be extended moving pallet plate 232 and pallet 27 into the space between tiers of articles 86 and 88, shaft 229 being withdrawn when pallet 27 is in place below tier 86 thereby depositing pallet 27 between the tiers.

Thereafter shaft 230 may be withdrawn and another pallet 27 deposited on pallet plate 232 from magazine 25 (as shown in FIG. 1). Balloons 166 may be again partially inflated (as shown in FIGS. 9 and 10), so that tier 86 is brought into contact with pallet 27 thereby allowing tiers 84 and tier 86 to be released from partial enclosure 44 without being dropped and exposing articles 80 and/or pallet 27 to damaging impacts. Enclosure 44 may thereafter be raised, balloons 66 deflated, and the two stacked half pallets of articles removed on tracks 150.

As shown in FIGS. 8 through 10 wherein suspension of the entire load above work surface 42 is illustrated, balloons 166 may be fully inflated and partial enclosure 44 received over all tiers 84 and adjacent to in-house pallet 27', for replacement of in-house pallet 27' by customer pallet 27. A shown in FIGS. 8 and 10, cylinders 245, having extendible shafts 247, may be provided below work surface 42 mounted on mounting plates 249.

Shafts 247 may be extended by application of air pressure through line 250 (upon activation of the "MIDPOSITION" switch of control panel 59 in FIG. 1B for example) so that, when tiers 84 are received by partial enclosure 44, balloons 166 may be partially deflated, or fully deflated and subsequently partially reinflated, as shown in FIGS. 9 and 10, and shafts 247 will thereby engage support arms 251 of support plate 168 and maintain mechanism 152 at a substantially level position with conveyor units 29 and 33 for removal of in-house pallet 27' and insertion of customer pallet 27 between the bottommost of tiers 84 and work surface 42. Thereafter, balloons 166 may be reinflated, shafts 247 withdrawn and partial enclosure 44 raised, whereupon, after complete deflation of balloons 166, the repalletized articles may be removed upon activation of convey mechanism 150.

An alternative embodiment of the apparatus for relative movement of stacked articles and a reference surface is shown in FIGS. 11 and 12. Partial enclosure 260 is similar in many regards to partial enclosure 44, and, upon placement over tiers of articles to be suspended, maintains a substantially sealed zone of differential pressure for suspension of the tiers as previously disclosed herein. However, partial enclosure 260 requires no means of elevation, utilizing instead doors 262 on opposite sides of the enclosure for passage therethrough of palletized articles 264 on conveyor 266, including work section conveyor 268.

Doors 262 include a configuration similar to side walls 76, 76', 77 and 77' of the embodiment shown in FIG. 2 but include in addition, seal 270 at the meeting of door halves 272 and 274 and door seals 276 over door hinges 278 (only two of which are shown in FIG. 11) and at the meeting of the door halves 272 and 274 with side walls 280. Each door half 272 and 274 includes its own spring unit 181, channeled section 142, and sealing strips 144 and 215 as herein previously disclosed.

As shown in FIGS. 12A and 12B, when stacked palletized articles 264 are in position within partial enclosure 260, and doors 262 are closed, operation of partial enclsoure 260 is very similar to operation of partial enclosure 44, with a substantially enclosed area of reduced pressure 282 being maintained around tiers of articles 284 and extending to the lowest of tiers 284 through channeled lower wall sections 142. Central conveyor section 268 employs a configuration similar to the configuration discussed with respect to FIGS. 7A and 7B of raising the tiers of articles into the partial enclosure 260 initially, lowering the tiers 288 for creation of a space between the uppermost of tiers 288 and the lowermost of tiers 284 for insertion of a pallet, removal of the lower half load, or other operations thereat.

As may be appreciated the embodiment of the invention shown in FIGS. 11 and 12 could be configured and employed for conducting many of the operations explained with reference to FIGS. 8 through 10, for example.

FIG. 13, 14A and 14B show the application of the apparatus in association with means for insertion and withdrawal of slip sheets below or between tiers of palletized articles. When partial enclosure 44 is in place over tiers of articles 84, and the work surface 42 or the partial enclosure 44 moved for vertical displacement of either the work surface or the tiers of articles, slip sheet placement and withdrawal mechanism 275 may be employed to insert slip sheet 277, typically a plastic, paper or cardboard sheet used to separate desired groupings of stacked articles.

Slip sheet mechanism 275 includes stripper plate 279 and grabber mechanism 281 mounted on cylinder shaft 283 extendible from cylinder 285, grabber mechanism 281 including grabber arms 287. As shown in FIGS. 14A and 14B, stripper plate 279 is inserted between slip sheet 277 and tier 84, for separating the sheet from the tier and maintaining the separation thereafter, by extension of shaft 283 from cylinder 285 thus allowing slip sheet 277 to fall free from the suction created around tier 84 and come to rest on pallet 27. Thereafter grabber arms 287 of grabber mechanism 281 may be closed on slip sheet 277 to thereby withdraw sheet 277 from pallet 27 upon retraction of shaft 283. Insertion of slip sheets is effected by substantially reversing the procedure hereinabove described.

FIGS. 15A and 15B are provided to illustrate various typical operations which may be carried out using the apparatus and method of this invention, it being understood that illustration of typical operations is not meant to suggest exhaustion of all operations capable of being performed by the apparatus and method. As shown in FIG. 15A, product A and/or product B can be brought into position at work surface 42 and all, or any part of, the tiers of product A or B can be suspended in device 40 to allow insertion of customer pallets 27 and removal of in-house pallets 27'. Two partial, or half, loads on two pallets may thus be obtained, with intermixing of loads being possible thereafter, either by use of the apparatus and method of this invention as illustrated in FIG. 15B, or by other conventional means, for example forklifts.

As shown in FIG. 15B, a reverse process may be undertaken whereby half loads on two pallets are converted into intermixed loads on a single pallet by suspension of the upper portion of product A in device 40 while the lower portion of product A as well as upper pallet 27'is conveyed away and replaced by product B resulting in an intermixed load of product A and B on a single pallet.

It is to be realized, while not specifically illustrated, that all motors are conventionally connected to a power source through the appropriate control mechanisms, for example the switches shown in FIGS. 1B. All pneumatic systems shown are, likewise, connected to an air supply through conventional operative mechanisms, for example solenoids, to appropriate operational control mechanisms.

All sealing strips used for sealing of the suspending device of this invention may be made of any suitable material, such as, for example, from a relatively thick, but flexible, plastic material. The walls of the partial enclosure may likewise be made of any suitable material, including sheet metal, plastic and the like. Additionally, safety features, such as a pressure relief valve and an emergency stop mechanism (as shown in FIG. 1B), are preferably provided. Conveyors, pallet magazines and pallet storage units now known and used may be employed in conjunction with this invention.

As may be appreciated from the foregoing, the apparatus and method of this invention provides a novel approach to the arrangement of tiers of stacked articles into desired loads employing a device for the suspension of multiple tiers of such articles having a partial enclosure capable of developing differential pressure adjacent the tiers for enhancing lift at the bottom surface of the tiers to be suspended thereby requiring no physical support member to maintain, or lift, the tiers of articles selected to be within the enclosure.

What is claimed is:

1. A device for effecting relative movement between a plurality of selected tiers of articles and a reference surface having said selected tiers stacked thereon with said selected tiers being independently movable with respect to one another, said device comprising:

pressure differential establishing means positionable adjacent to said selected tiers of articles, said pressure differential establishing means including a top wall member and a plurality of side wall members at least some of which include movable means spaced from said top wall member, said movable means having channeling means and sealing means connected thereto, said channeling means establishing said pressure differential adjacent to substantially all of said plurality of selected tiers above said reference surface, and said sealing means positioned to be contiguous to the lowermost tier of said selected tiers of articles;

pressure effecting means for effecting a pressure differential within said pressure differential establishing means, said pressure differential being sufficient to maintain said selected tiers of articles within said pressure differential establishing means without support provided by said reference surface; and displacement means for causing relative movement between said selected tiers of articles and said reference surface, said movement having a vertical component.

2. The device of claim 1 wherein said displacement means causes substantially vertical relative movement between said selected tiers and said reference surface.

3. The device of claim 1 wherein said reference surface is caused to move by said displacement means.

4. The device of claim 1 wherein said pressure differential establishing means is caused to move by said displacement means to thereby effect movement of said selected tiers relative to said reference surface.

5. The device of claim 1 wherein said side wall members include four side wall portions configured to form a substantially rectangular open bottomed box.

6. A device for effecting relative movement between a plurality of selected tiers of articles and a reference surface having said selected tiers stacked thereon with said selected tiers having a bottom tier adjacent said reference surface, said device comprising:

partial enclosure means having a top wall member and side wall members configured to receive said selected tiers of articles so that said top wall member and said side wall members of said partial enclosure means and said bottom tier of said tiers of articles define a substantially enclosed area, said side wall members including movable means connected to said side wall members, said movable means being urged to a position contiguous to said bottom tier of said selected tiers of articles upon reduction of fluid pressure within said substantially enclosed area, and said movable means including fluid channeling means whereby said reduced fluid pressure within said partial enclosure means is established adjacent to substantially all said selected tiers of articles received by said partial enclosure means;

means for reducing fluid pressure within said substantially enclosed are so that said selected tiers are maintainable within said substantially enclosed area solely by said reduced fluid pressure; and means for causing relative movement between said selected tiers of articles and said reference surface, said movement having a vertical component.

7. The device of claim 6 wherein said movable means include sealing means for substantially establishing and maintaining a seal between said movable means and said bottom tier of said selected tiers of articles.

8. The device of claim 6 wherein said means for reducing fluid pressure within said substantially enclosed area includes a high pressure air pump connected to said partial enclosure means.

9. An apparatus for creating a desired arrangement of articles stacked in tiers and units enabling definition of desired groupings of said articles stacked in tiers, said apparatus comprising:

first conveying means for conveying said articles stacked in tiers to a work area;

second conveying means for conveying said units to said work area;

third conveying means for conveying said groupings of articles away from said work area;

fourth conveying means for conveying said units away from said work area;

fifth conveying means for conveying said units to said work area at a position above said second conveying means;

partial enclosure means at said work area configured to receive at least two of said tiers of said articles, said at least two of said tiers of said articles including a bottom tier of articles, said partial enclosure means and said bottom tier of articles of said at least two of said tiers of said articles defining a substantially enclosed area;

means for reducing fluid pressure within said substantially enclosed area so that said at least two of said tiers of articles are maintainable within said substantially enclosed area solely by said reduced fluid pressure; and means for causing relative movement between said at least two of said tiers of said articles and said first conveying means at said work area, said movement having a vertical component.

10. The apparatus of claim 9 wherein said apparatus includes unit supply means for supplying said units to said second and said fifth conveying means.

11. The apparatus of claim 9 wherein said apparatus includes unit storage means for receiving said units from said fourth conveying means and for storing said units thereat.

12. The apparatus of claim 9 wherein said means for causing relative movement includes at least one of elevator means for causing substantially vertical movement of said partial enclosure means and pneumatic means mounted below said first conveying means at said work area for causing substantially vertical movement of said first conveying means at said work area.

13. The apparatus of claim 9 wherein said units are one of pallets and slip sheets.

14. A method for causing separation between a plurality of preselected tiers of articles arranged in a stack and an initial reference surface for establishing a new reference surface beneath said plurality of preselected tiers, each tier in said plurality of preselected tiers being independently movable with respect to one another, said method comprising;

partially enveloping said plurality of preselected tiers in a partial enclosure having a top wall and a plurality of side walls positionable adjacent to said plurality of preselected tiers;

establishing a pressure differential effecting said plurality of preselected tiers of articles within said partial enclosure sufficient to move movable portions of said side walls spaced from said top wall into contact with at least a lowermost tier of said plurality of preselected tiers of articles and to support said plurality of preselected tiers without support provided by said initial reference surface;

channeling said pressure differential to said lowermost tier of said plurality of preselected tiers of articles through said movable portions of said side walls;

sealing said partial enclosure against said lowermost tier of said plurality of preselected tiers of articles;

moving one of said effected plurality of preselected tiers of articles and said initial reference surface to establish a spatial separation therebetween;

providing said new reference surface at said spatial separation;

moving one of said effected plurality of preselected tiers of articles and said new reference such that said effected plurality of preselected tiers of articles and said new reference surface are contiguous to one another; and terminating said pressure differential effecting said plurality of preselected tiers of articles.

15. The method of claim 14 wherein said initial reference surface comprises the top surface of at least one additional tier of articles and wherein said new reference surface comprises at least one of the top surface of at least one different tier of articles, a pallet, and a slip sheet.

* * * * *